United States Patent
Britz et al.

(10) Patent No.: US 8,417,121 B2
(45) Date of Patent: Apr. 9, 2013

(54) METHOD AND APPARATUS FOR PROVIDING COMMUNICATION USING A TERAHERTZ LINK

(75) Inventors: David Britz, Rumson, NJ (US); Robert R. Miller, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 300 days.

(21) Appl. No.: 12/789,963

(22) Filed: May 28, 2010

(65) Prior Publication Data

US 2011/0293268 A1     Dec. 1, 2011

(51) Int. Cl.
*H04B 10/00* (2006.01)
*H04B 10/06* (2006.01)

(52) U.S. Cl.
USPC ............ 398/119; 398/208; 398/209; 398/212

(58) Field of Classification Search .................. 398/118, 398/119, 124–126, 128, 129, 135–137, 202, 398/208, 209, 212
See application file for complete search history.

(56) References Cited

U.S. PATENT DOCUMENTS

| | | | |
|---|---|---|---|
| 5,359,669 A | 10/1994 | Shanley et al. | |
| 7,197,248 B1 * | 3/2007 | Vorontsov et al. | 398/119 |
| 7,221,931 B2 | 5/2007 | Benco et al. | |
| 7,768,380 B2 | 8/2010 | Breed et al. | |
| 8,126,467 B2 * | 2/2012 | Choi et al. | 455/444 |
| 8,213,022 B1 * | 7/2012 | Riza et al. | 356/609 |

| | | | |
|---|---|---|---|
| 2006/0114170 A1 | 6/2006 | Sievenpiper | |
| 2008/0013071 A1 | 1/2008 | Tsumura et al. | |
| 2008/0147409 A1 | 6/2008 | Taormina | |
| 2008/0245872 A1 | 10/2008 | Good | |
| 2008/0285032 A1 | 11/2008 | Ohkubo | |
| 2009/0088203 A1 | 4/2009 | Havens et al. | |
| 2009/0163175 A1 | 6/2009 | Shi et al. | |
| 2010/0067918 A1 * | 3/2010 | Federici et al. | 398/158 |
| 2010/0102233 A1 | 4/2010 | Gelmond | |
| 2010/0165431 A1 | 7/2010 | Li et al. | |

(Continued)

FOREIGN PATENT DOCUMENTS

EP   1 596 470 A1   11/2005
EP   1 816 491 A1   8/2007

(Continued)

OTHER PUBLICATIONS

International Search Report and Written Opinion for PCT/US2010/053320, Jan. 27, 2011, consists of 12 unnumbered pages.

(Continued)

*Primary Examiner* — Dalzid Singh

(57) ABSTRACT

A method and apparatus for establishing a terahertz link using a multi-element lens array that comprises a liquid lens are disclosed. For example, the method receives detected terahertz signals from one or more detectors, where a liquid lens is deployed with each of the one or more detectors. The method determines, for each of the detected signals, if the detected signal is out of focus, and applies a corrective voltage to each liquid lens that corresponds to a detected terahertz signal that is out of focus, wherein the corrective voltage adjusts a focus of the detected signal. The method measures a signal-to-noise ratio of the detected signals, and establishing a terahertz link via at least one of the detected terahertz signals with a highest signal-to-noise ratio.

19 Claims, 5 Drawing Sheets

U.S. PATENT DOCUMENTS

| | | | |
|---|---|---|---|
| 2010/0166430 A1* | 7/2010 | Alten | 398/135 |
| 2011/0008062 A1* | 1/2011 | Ashdown | 398/212 |
| 2011/0133087 A1 | 6/2011 | Mann et al. | |
| 2011/0293268 A1 | 12/2011 | Britz et al. | |
| 2012/0099856 A1* | 4/2012 | Britz et al. | 398/26 |

FOREIGN PATENT DOCUMENTS

| | | |
|---|---|---|
| EP | 2 076 071 A1 | 1/2009 |
| WO | WO 00/31679 | 6/2000 |
| WO | WO 2006/023195 A2 | 3/2006 |
| WO | WO 2006/055798 A1 | 5/2006 |
| WO | WO 2007/088453 A1 | 9/2007 |
| WO | WO 2008/121159 A2 | 10/2008 |

OTHER PUBLICATIONS

S. Kuiper et al., "Variable-focus liquid lens for miniature cameras," Applied Physics Letters, AIP, American Institute of Physics, vol. 85, No. 7, Jan. 1, 2004, pp. 1128-1130.

International Search Report and Written Opinion for PCT/US2010/053311, Jan. 13, 2011, consists of 12 unnumbered pages.

* cited by examiner

METHOD AND APPARATUS FOR PROVIDING COMMUNICATION USING A TERAHERTZ LINK

The present disclosure relates generally to communication using a terahertz link and, more particularly, to a method for providing communication over a terahertz link using a multi-element lens array that comprises a liquid lens.

BACKGROUND OF THE DISCLOSURE

The increasing utilization of mobile personal devices, e.g., cell phones, smart phones, etc., has dramatically increased network traffic. For example, fully one billion people worldwide are Internet users with a large portion of this population accessing the Web through their mobile phones. In addition, the behavior of mobile phone customers has changed in recent years. The number of users accessing media-rich data and social networking sites via mobile personal devices has risen dramatically. For example, the average owner of a smart phone today transacts three times the amount of data than did early smart phone users. Consequently, there is a need to continually grow the network capacity to accommodate the ever increasing traffic.

But as is often the case, with great success also comes great challenges. For example, some cellular service providers are struggling to keep up with demand and they are placing limits on data usage to conserve network bandwidth and spectrum. This industry pushback is clearly a reaction to the recognition of the bandwidth and capacity limits of existing cellular systems. However, placing limits on data usage is an unpractical approach to reduce demand, which also reduces revenue for the service provider and creates dissatisfaction for customers.

SUMMARY OF THE DISCLOSURE

In one embodiment, the present disclosure teaches a method and apparatus establishing a terahertz link using a multi-element lens array that comprises a liquid lens. For example, the method receives detected terahertz signals from one or more detectors, where a liquid lens is deployed with each of the one or more detectors. The method determines, for each of the detected signals, if the detected signal is out of focus, and applies a corrective voltage to each liquid lens that corresponds to a detected terahertz signal that is out of focus, wherein the corrective voltage adjusts a focus of the detected signal. The method measures a signal-to-noise ratio of the detected signals, and establishing a terahertz link via at least one of the detected terahertz signals with a highest signal-to-noise ratio.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
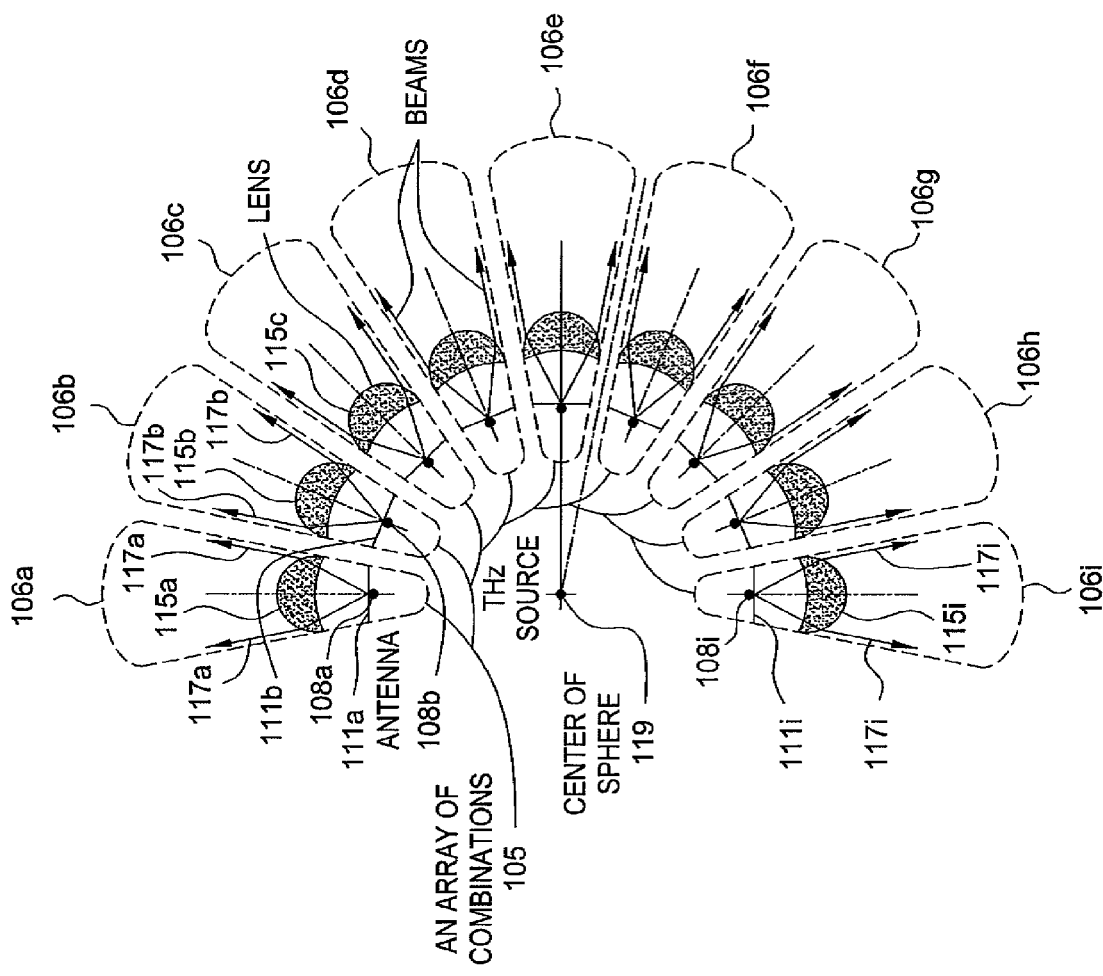
FIG. 1 illustrates a sectional view of a transmitter with a fly's eye structure.

The present disclosure broadly teaches a method and apparatus for providing communication over a terahertz link using a mobile communication device having a multi-element lens array that comprises a liquid lens, that is capable of communicating with a network, e.g., via a base station. In turn, the communication can be extended into the network, thereby allowing the mobile device to access various services over the network. Although the present disclosure is discussed below in the context of wireless networks, e.g., cellular networks, the present disclosure is not so limited. Namely, the present disclosure can be applied to all networks that would benefit from improved control of a directionality of terahertz signals transmitted to and from mobile devices, e.g., laptops, mobile phones, and the like.

In one embodiment, the current method enables expansion of network capacity by employing wireless Local Area Networks (LANs) that operate in a terahertz (THz) spectrum. Devices that operate in the THz spectrum by definition use a Terahertz frequency. A critical consideration for using THz frequencies is related to the sizes of the terahertz antennas. The wavelength of a waveform whose frequency is in the order of a THz is very small. As the wavelength becomes smaller, the antenna's aperture, (i.e., the area over which the antenna collects or launches an electromagnetic wave), is correspondingly reduced. Conventional microwave cellular radios have antennas that are on the order of inches in length. But as wavelengths get smaller, and especially in the higher frequency domains of THz frequencies, antennas can shrink to literally microscopic proportions. The proportion of radio energy intercepted and collected by so small an antenna is quite small, dramatically reducing the reach of signals transmitted over terahertz frequency.

One approach for improving the reach of transmitted signals is to place a lens, e.g., a dielectric lens, in front of the transmitting and receiving antennas. The combination of the antenna and lens has an improved gain. Unfortunately, the improvement in the gain comes at a cost in terms of directionality. Specifically, a signal (also referred to as a beam) transmitted by a combination of an antenna and a lens (placed in front of the antenna) is highly directional and may be referred to as an omni-directional signal. Furthermore, the gain of the lens increases as the solid angle (measured in steradians) illuminated by the antenna decreases. In order to achieve a high gain, the solid angle illuminated by the antenna has to become quite small. The highly directional nature of the transmitted signal and the need to minimize the solid angle illuminated by the antenna, to achieve the desired gain, create a challenge for beam alignment between the transmitter and receiver antennas. For example, if a mobile device, e.g., a mobile phone, is attempting to communicate with a base station over a THz frequency, the transceivers in the mobile phone and the base station may not succeed in establishing a communications link.

In one embodiment, the current method teaches a beam alignment (signal alignment) between the transmitter and receiver antennas using a spherical structure and a hemispherical structure for the transmitting and receiving antennas, respectively. The transmitter and receiver may be combined to share circuitry and housing. In such embodiment, the combination of the transmitter and receiver is referred to as a transceiver. A transceiver that has a spherical structure for transmitting and a hemispherical structure for receiving is also referred to as a fly's eye structure.

The spherical structure is used for transmitting a plurality of signals, with each signal aimed outward from the center of the sphere, such that the plurality of the signals covers an entire three dimensional space. Similarly, the hemispherical structure is used for receiving a plurality of signals, with each signal being received by a combination of an antenna and a lens. The hemispherical structure for receiving a plurality of signals may be a cluster of receivers, wherein each receiver has a combination of an antenna and a lens. In one embodiment, the combined field of view of all of the receivers in a cluster covers a hemisphere or a near hemisphere.

In one embodiment, the current method teaches using individual integrated transceivers directly behind a combination of an antenna and a lens. The individual integrated transceivers are connected to the combination of the antenna and lens, wherein the lens is made of a dielectric material.

FIG. 1 illustrates a sectional view of a transmitter 100 with a fly's eye structure. In one embodiment, the transmitter 100 comprises an array 105 of a plurality of combinations 106a-106i, wherein each of the combinations 106a-106i comprises a corresponding THz source 108a-108i connected to an antenna 111a-111i, and a lens 115a-115i. For example, the combination 106a comprises a THz source 108a connected to an antenna 111a, and a lens 115a. Similarly, the combination 106b comprises a THz source 108b connected to an antenna 111b, and a lens 115b, and so on. Each of a plurality of signals 117a-117i is aimed outward from a center of the sphere 119.

The combination of: (1) transmitting using many directed signals; and (2) receiving using a cluster of receivers, increases the likelihood of establishing a link between a transceiver in a mobile device and another transceiver, e.g., in a base station. Specifically, a signal from among all the signals received by the cluster of receivers may be selected. For the example above, a transceiver in a device may detect one of more of the plurality of signals 117a-117i transmitted by another device. One of the plurality of signals 117a-117i may then be selected by the receiving device.

In one embodiment, the service provider may configure a plurality of criteria for selecting a particular signal. For example, the selection may be based on avoidance of link shadowing, Signal-To-Noise Ratio (SNR), etc. SNR refers to a measure of signal strength relative to background noise usually measured in decibels (dB). For example, the SNR for each of the signals received by the cluster of receivers can be measured and the signal with the highest SNR will be selected.

However, the user of the mobile device may change his/her location and may lose a connection. Hence, maximizing the reach of the system may need active steering of the highly directional signals based on a positional relationship between a transceiver in the mobile device and a transceiver in the base station. Furthermore, as described above, receivers operating in THz frequencies have very small aperture (e.g., in the order of microns in diameter). Therefore, each lens implemented in the cluster of receivers may need to accurately focus the collected THz energy onto a small detector.

However, as described above, THz frequencies travel very short distances. The near-field nature of the THz transmitters and receivers has the following challenges:

A slight movement of the transceivers will change the focal point of the received signal (beam);

The receiving lens may steer a focusing signal (beam) to a focus spot which is offset from the small detector area of the receiver, possibly failing to illuminate the detector entirely; and If the focus spot moves away from the ideal optical axis (i.e., the transmitted signal and lens axis are not perfectly aligned), the resulting focus spot may be many times larger and of lower average energy, than the ideally designed focal spot, rendering a lower link margin.

In one embodiment, the current method teaches an active and adaptive control of the focus point (spot) using a liquid lens to optimize THz signal detection. In one embodiment, a liquid lens is a lens made from two liquids of varying density sandwiched between two windows in a conical vessel. For example, the liquids may be two types of oils having different density, e.g., olive oil, vegetable oil, rape seed oil, grape seed oil, polyglycol oil and the like. It should be noted that other liquids in addition to oil can be used. The type of liquids may be selected based upon on a desired behavior such as the ability to allow passage of THz signals without degrading or distorting the THz signals. For example, various illustrative liquids that can used are disclosed in Gorenflo et al., "Dielectric properties of-oil-water complexes using terahertz transmission spectroscopy", Chemical Physics Letters, 421, 494-498 (2006).

Specifically, if a voltage is applied across the conical structure, the shape of the interface between the two types of liquid changes. For example, if zero volts are applied, the shape of the interface will be flat, whereas if 40 volts are applied, the shape will be highly convex. The ability to manipulate the shape of the interface between the two liquids allows for electronic control of certain properties of the lens. Hence the selection of the liquids may be based on a desired shape of the interface between the two liquids. For example, a far field imaging lens (e.g., a regular lens) can be changed to a near field imaging lens capable of taking microscopic type images. The liquid lens is small in size and can be fitted into an array of lenses.

In one embodiment, the current method provides an active control to pre-distort the shape of the liquid lens to compensate for a shift in image. That is, the method pre-distorts a signal to compensate for a distortion that would exist from a signal received with an offset from the optical axis 228 shown in FIG. 2 below. Thus, as the angle of the received signal changes, the shape of the liquid lens is actively adjusted to dynamically control the focal point.

In one embodiment, the liquid lens is positioned between each of the detectors and a primary lens of the fly's eye structure. For example, each of a plurality of liquid lenses may be designed to optically operate in conjunction with a fixed primary lens, e.g., a silicon lens. The liquid lens adjusts the focusing power of the corresponding primary lens. In one embodiment, a software or electronic system adjusts the shape of the liquid lens, thereby adjusting the focusing power of the combination of the liquid lens and the fixed primary lens.

Figure 2:
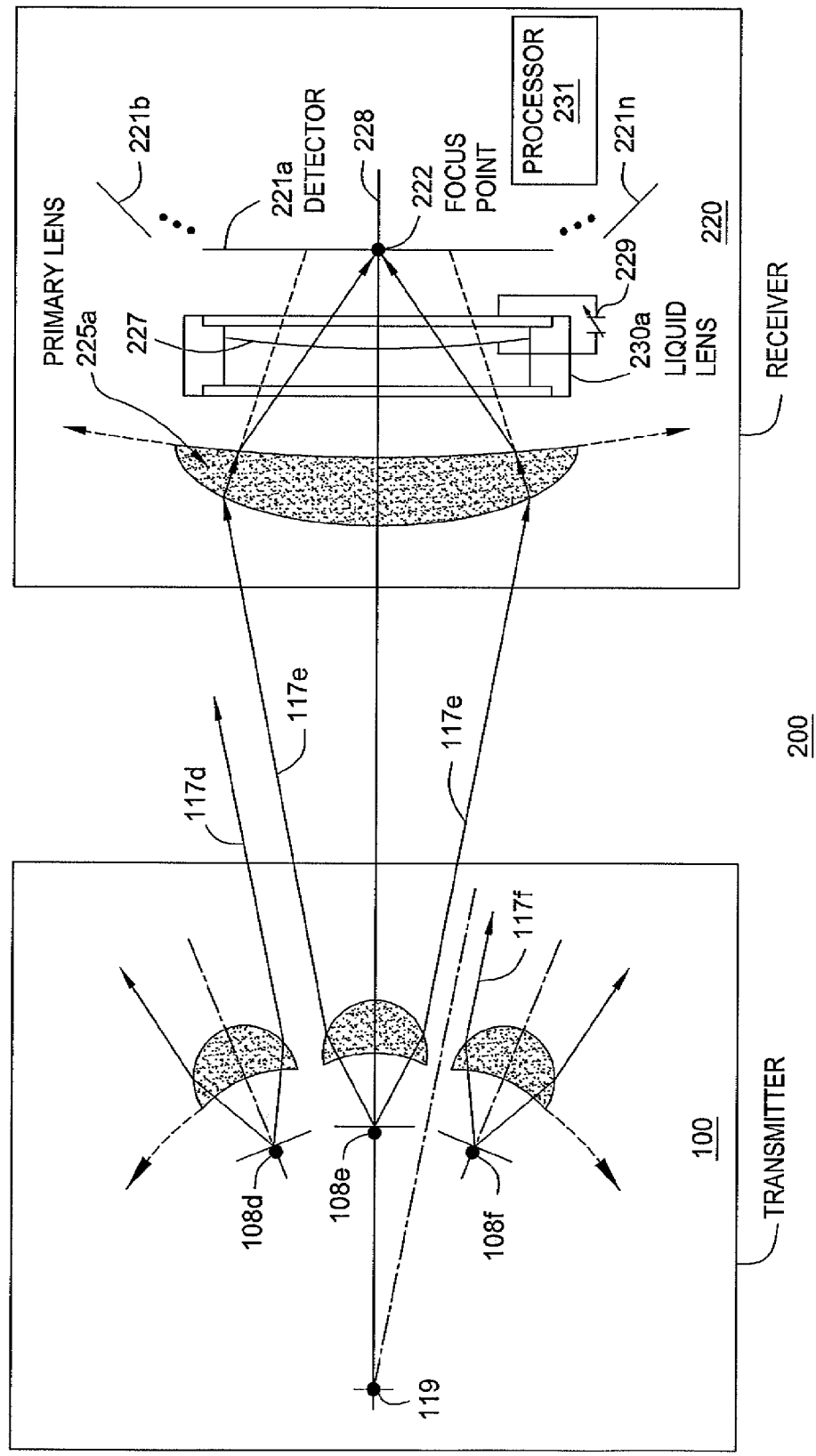
FIG. 2 illustrates an exemplary communications link established between the transmitter and a receiver.

FIG. 2 illustrates an exemplary communications link 200 established between the transmitter 100 and a receiver 220. The receiver 220 comprises an array of a plurality of combinations, wherein each of the combinations comprises a liquid lens 230a-n positioned between each of its detectors 221a-n and a primary lens 225a-n. For example, a combination comprises a liquid lens 230a positioned between a detector 221a and a primary lens 225a. Similarly, each of the other combinations (not shown) has a liquid lens positioned between a detector and a primary lens. It should be noted that although only one combination is shown in the receiver 220 for clarity reasons, there are in fact a plurality of such combinations that can be configured into a hemispherical configuration or a hemispherical configuration. The combination of the primary lens 225a and liquid lens 230a with the assistance of a variable voltage source 229 focuses the signals 117e onto the focus point 222 onto a THz detector 221. For example, if the focus point of signal 117e is off-set, then the shape of the interface of the liquid lens 230 is dynamically adjusted via processor 231 to ensure the signal is focused back at the focus point 222.

Note that any number of the plurality of signals 117a-117i may be received. For example, another detector (not shown) may receive the signal 117d. The combination of: (1) transmitting using many directed signals; and (2) receiving using a cluster of receivers, increases the likelihood of establishing a link between a transceiver in a mobile device and a transceiver in a base station. Specifically, a signal from among all signals received by the cluster of receivers can be selected. For the example above, a transceiver in a device may detect one or more of the plurality of signals 117a-117i transmitted by another device. One of the signals 117a-117i may then be selected by the receiving device based on the SNR or any other established criteria.

Figure 3:
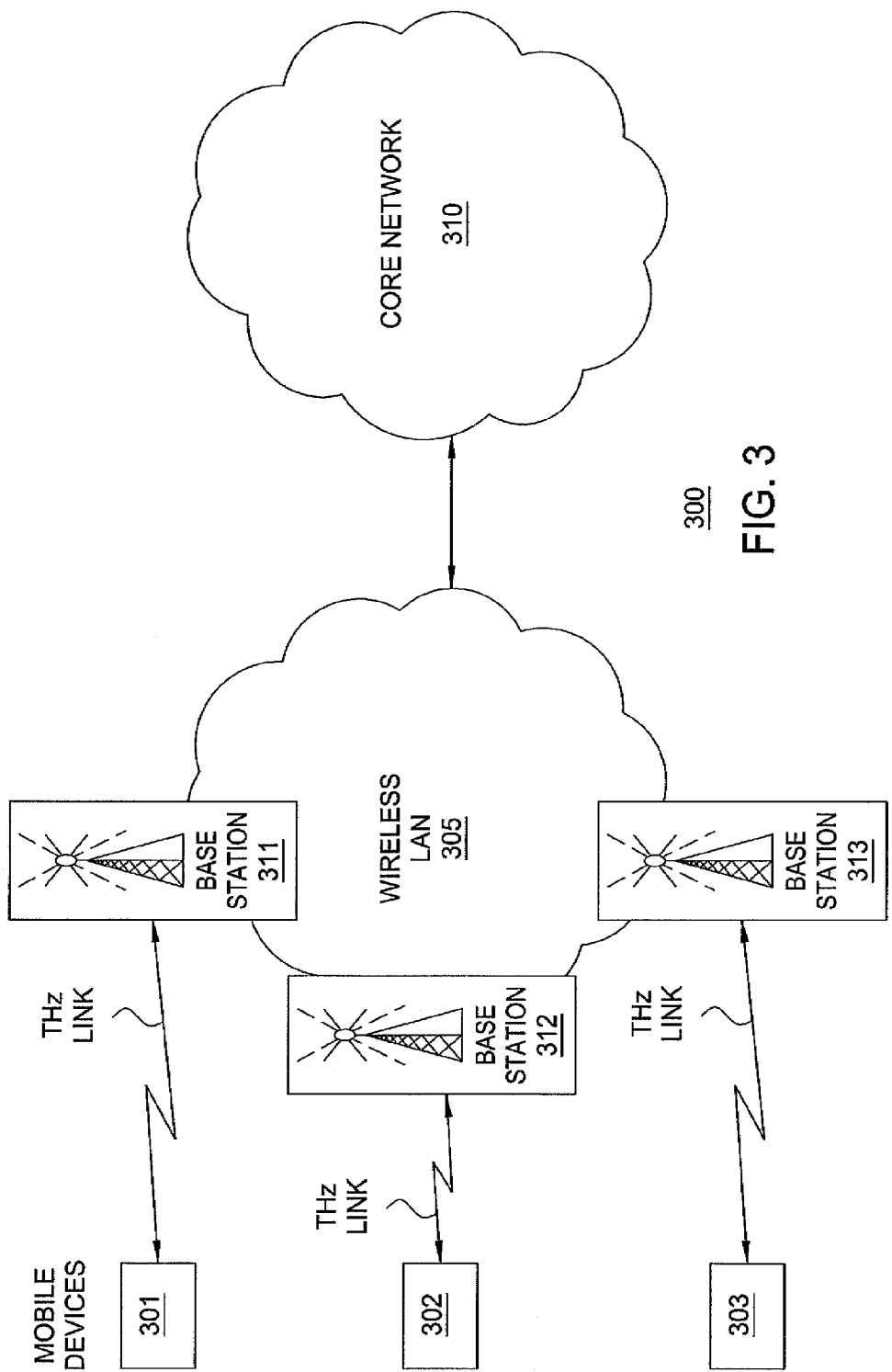
FIG. 3 illustrates a block diagram depicting an exemplary network related to the current disclosure.

FIG. 3 illustrates a block diagram depicting an exemplary network 300 related to the current disclosure. The network 300 comprises a plurality of mobile devices 301-303 configured for communicating with a core network 310 via a wireless Local Area Network (LAN) 305. The LAN 305 comprises base stations 311-313. The base stations provide mobile devices with connectivity for forwarding received signals to the network 310. Each of the mobile devices 301-303 may communicate with one or more of the base station 311-313 via a THz frequency.

In one embodiment, the service provider may implement the current method in the mobile devices 301-303 and base stations 311-313. That is, the service provider may implement transceivers with a fly's eye structure in the mobile devices and base stations. A liquid lens is positioned between each pair of detectors and primary lenses in the fly's eye structure. A controller in the mobile device or base station then determines if a received signal is out of focus. For example, signals received from two of ten detectors may be out of focus. The two signals that are out of focus may then need corrective action. The controller may then apply a corrective voltage to the liquid lens that corresponds to the detector whose signal is out of focus. Specifically, the controller adjusts the shape of the interface of the liquid lens, thereby adjusting the focusing power of the combination of the liquid lens and the fixed primary lens. For example, the liquid lenses associated with the two detectors that received an out of focus signal are identified. The method then applies an appropriate voltage such that a focused signal is received by their respective detectors.

Those skilled in the art will realize that although only three mobile devices, three base station and one LAN are depicted in FIG. 3, the communication system 300 can be expanded by including any number of mobile devices, access networks, network elements, without altering the scope of the present disclosure.

In one alternate embodiment, the two optical stage arrangement (fixed lens and liquid lens) as discussed above can modified by replacing the fixed lens with a second adaptive liquid lens that would function as the primary lens. The use of two liquid lenses rather than one may allow for a greater adaptive focus control response and less severe liquid lens curvatures in either lens stage. This alternate embodiment will also require less electrical power and thus will prolong battery life in the mobile devices.

Figure 4:
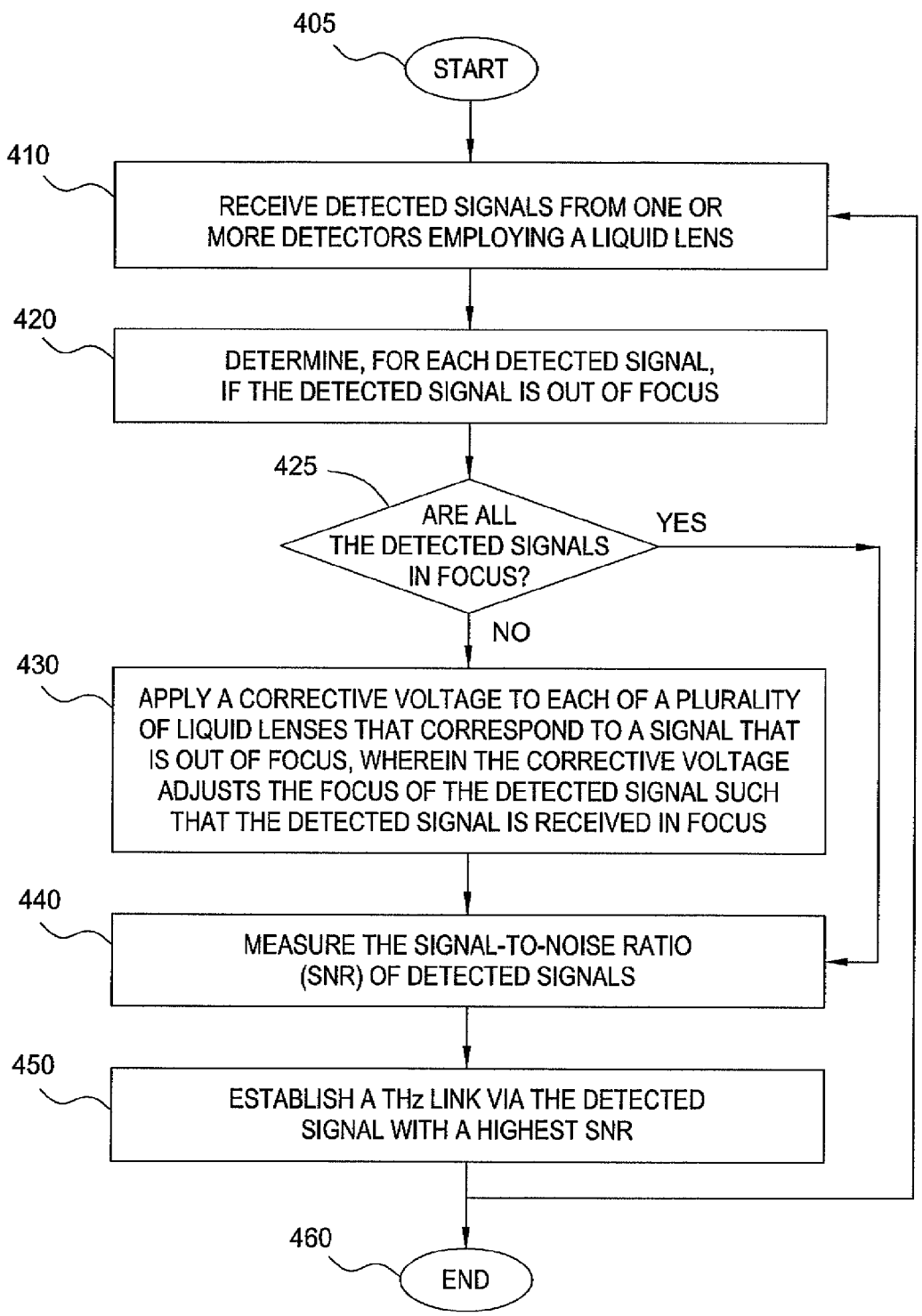
FIG. 4 illustrates a flowchart of a method for providing communication using a THz link.

FIG. 4 illustrates a flowchart of a method 400 for providing communication using a THz link. In one embodiment, one or more steps of method 400 can be implemented in a mobile device or a base station. For example, the method 400 may be performed by a controller in a mobile device or a base station. Method 400 starts in step 405 and proceeds to step 410.

In step 410, method 400 receives detected THz signals from one or more detectors employing a liquid lens. For example, a liquid lens may be employed by each of a plurality of detectors in a transceiver with a fly's eye structure. The liquid lens (broadly a first lens) is positioned between its corresponding fixed lens (broadly a second lens) and a THz signal detector. The controller may then receive detected THz signals from each of the one or more detectors in the fly's eye structure.

In step 420, method 400 determines, for each of the detected THz signals, if the detected THz signal is out of focus. For example, one or more of the THz signals may be received with an offset from the optical axis.

In step 425, method 400 determines if all the detected signals are in focus. If all the detected THz signals are in focus (no detected signal is out of focus), the method proceeds to step 440. Otherwise, the method proceeds to step 430.

In step 430, method 400 applies a corrective voltage to each of a plurality of liquid lenses that correspond to a THz signal that is out of focus, wherein the corrective voltage adjusts the focus of the detected THz signal such that the detected signal is received in focus, or to a greater degree of focus if the offset is too great to be fully corrected. Specifically, the controller adjusts the shape of the interface of the liquid lens associated with the detector that received the out of focus signal by applying an appropriate voltage such that a focused signal is received by the corresponding detector.

In step 440, method 400 measures the Signal-to-Noise Ratio (SNR) of detected signals. For example, the method may have received several signals in focus but they may have different SNRs. In another example, some signals may have been received via a corrective action (via the liquid lens) while other signals were in focus without any corrective action. SNRs are then measured for all the received signals (with or without the liquid lens) from all the detectors.

In step 450, method 400 establishes a THz link via the detected signal with a highest SNR. For example, the method selects the detected signal with a highest SNR and the THz link between two devices (e.g., a mobile device and a base station) is established over the selected signal. It is important to note that the selected signal may be a signal received via a corrective action or without the corrective action. It should be noted that there may be a feedback path between steps 430 and 440, where the measured SNR can be used to fine tune the amount of voltage to apply to each of the liquid lens.

The method then proceeds to step 460 to end processing the detected signals or alternatively to step 410 to continue receiving more detected signals.

It should be noted that although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision, do not necessarily require that both branches of the determining operation be practiced. In other words, one of the branches of the determining operation can be deemed as an optional step.

It should be noted that the mobile device may comprise various user interfaces for facilitating communication. For example, a user interface may include a physical button or key on the mobile device for selecting frequency spectrum, e.g. THz versus cellular.

Figure 5:
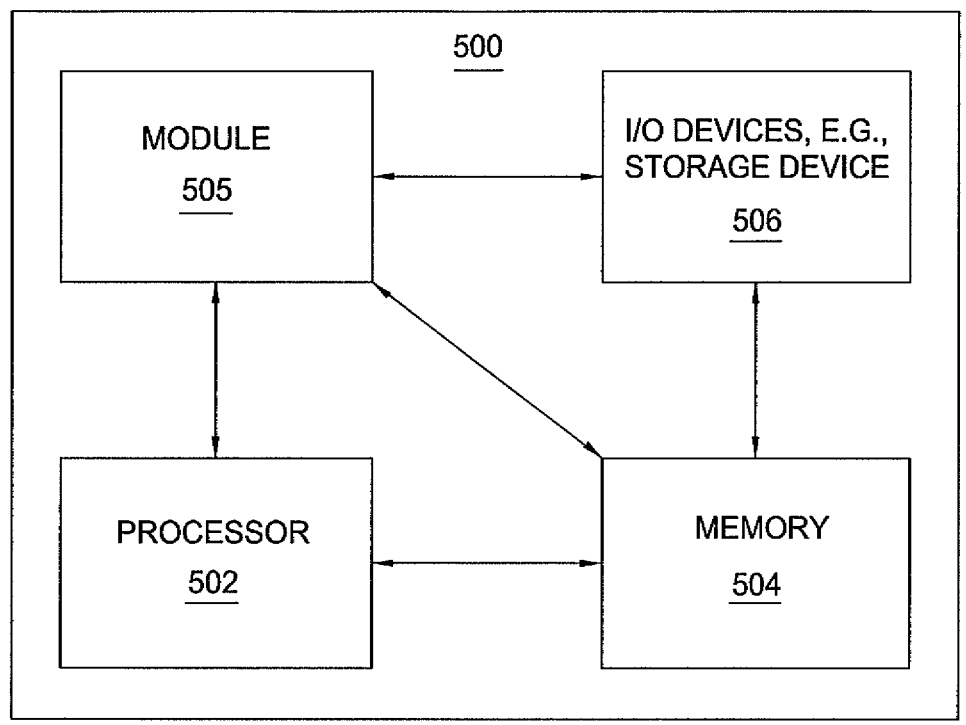
FIG. 5 illustrates a high-level block diagram of a mobile device suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU or a controller), a memory 504, e.g., random access memory (RAM) and/or read only memory (ROM), a module 505 for providing communication using a THz link, and various input/output devices 506 (e.g., storage devices, including but not limited to, a tape drive, a floppy drive, a hard disk drive or a compact disk drive, a receiver as discussed above, a transmitter as discussed above, a transceiver as discussed above, a speaker, a display, a speech synthesizer, an output port, and a user input device (such as a keyboard, a keypad, a mouse, alarm interfaces, power relays and the like)).

It should be noted that the present disclosure can be implemented in a combination of software and hardware, e.g., using application specific integrated circuits (ASIC), a general-purpose computer or any other hardware equivalents. In one embodiment, the present module or process 505 for providing communication using a THz link can be loaded into memory 504 and executed by processor 502 to implement the functions as discussed above. As such, the present method 505 for providing communication using a THz link (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing a terahertz link, comprising:
   receiving, by a processor, detected terahertz signals from a plurality of detectors, where a liquid lens is deployed with each of the plurality of detectors;
   determining, by the processor, for each of the detected signals, if the detected signal is out of focus;
   applying, by the processor, a corrective voltage to each liquid lens that corresponds to a detected terahertz signal that is out of focus, wherein the corrective voltage adjusts a focus of the detected signal;
   measuring, by the processor, a signal-to-noise ratio of the detected signals; and
   establishing, by the processor, a terahertz link via one of the detected terahertz signals with a highest signal-to-noise ratio.

2. The method of claim 1, wherein the receiving the detected terahertz signals is performed by a cluster of the plurality of detectors having a combined field of view that is hemispherical.

3. The method of claim 1, wherein each liquid lens is deployed between a respective detector of the plurality of detectors and a primary lens.

4. The method of claim 3, wherein the primary lens comprises a second liquid lens.

5. The method of claim 1, wherein the applying of the corrective voltage is performed by the processor that adjusts a shape of an interface of the liquid lens.

6. The method of claim 1, wherein the detected signals are transmitted by a transmitter, with each of the detected signal being aimed outward from a center of a spherical structure.

7. The method of claim 1, wherein the detected terahertz signals are received by a mobile device.

8. The method of claim 1, wherein the detected terahertz signals are received by a base station.

9. A tangible computer-readable storage medium storing a plurality of instructions which, when executed by a processor, cause the processor to perform operations for establishing a terahertz link, the operations comprising:
   receiving detected terahertz signals from a plurality of detectors, where a liquid lens is deployed with each of the plurality of detectors;
   determining, for each of the detected signals, if the detected signal is out of focus;
   applying a corrective voltage to each liquid lens that corresponds to a detected terahertz signal that is out of focus, wherein the corrective voltage adjusts a focus of the detected signal;
   measuring a signal-to-noise ratio of the detected signals; and
   establishing a terahertz link via at l act one of the detected terahertz signals with a highest signal-to-noise ratio.

10. The tangible computer-readable storage medium of claim 9, wherein the receiving the detected terahertz signals is performed by a cluster of the plurality of detectors having a combined field of view that is hemispherical.

11. The tangible computer-readable storage medium of claim 9, wherein each liquid lens is deployed between a respective detector of the plurality of detectors and a primary lens.

12. The non transitory tangible computer-readable storage medium of claim 11, wherein the primary lens comprises a second liquid lens.

13. The tangible computer-readable storage medium of claim 9, wherein the applying of the corrective voltage is performed by the processor that adjusts a shape of an interface of the liquid lens.

14. The tangible computer-readable storage medium of claim 9, wherein the detected signals are transmitted by a transmitter, with each of the detected signal being aimed outward from a center of a spherical structure.

15. The tangible computer-readable storage medium of claim 9, wherein the detected terahertz signals are received by a mobile device.

16. The tangible computer-readable storage medium of claim 9, wherein the detected terahertz signals are received by a base station.

17. A receiver, comprising:
   a plurality of first lens;
   a plurality of liquid lens;
   a plurality of detectors, for receiving a plurality of terahertz signals, wherein one of the plurality of first lens is arranged with a corresponding one of the plurality of liquid lens and with a corresponding one of plurality of detectors to form a respective combination, wherein when one of the plurality of terahertz signals is received by a respective combination and is out of focus, then a variable voltage source applies a voltage to a respective liquid lens to focus one of the plurality of terahertz signals onto a respective detector; and
   a processor for measuring a signal-to-noise ratio of each of the plurality of terahertz signals to determine whether one of the plurality of terahertz signals is received out of focus.

18. The receiver of claim 17, wherein the plurality of first lens comprises a second set of liquid lens.

19. The receiver of claim 17, wherein the receiver is deployed in a mobile device.

* * * * *